United States Patent [19]

Salama et al.

[11] 4,409,824
[45] Oct. 18, 1983

[54] FATIGUE GAUGE FOR DRILL PIPE STRING

[75] Inventors: Mamdouh M. Salama; Michael W. Joosten; Wiley E. Zimmerman, all of Ponca City, Okla.; Rhea W. Bockhorst, Morgantown, W. Va.

[73] Assignee: Conoco Inc., Ponca City, Okla.

[21] Appl. No.: 301,994

[22] Filed: Sep. 14, 1981

[51] Int. Cl.³ .............................................. E21B 47/00
[52] U.S. Cl. ........................................ 73/151; 73/787
[58] Field of Search ................ 73/763, 764, 768, 787, 73/151

[56] References Cited

U.S. PATENT DOCUMENTS

| | | |
|---|---|---|
| 3,376,921 | 4/1968 | Manry et al. . |
| 3,495,079 | 2/1970 | Halawa et al. . |
| 3,628,377 | 12/1971 | Weiss ..................... 73/764 |
| 3,686,942 | 8/1972 | Chatard et al. . |
| 3,777,555 | 12/1973 | Petrisko et al. ........... 73/764 |
| 3,824,851 | 7/1974 | Hagar et al. ............. 73/151 |
| 3,855,853 | 12/1974 | Claycomb ................ 73/151 |
| 3,864,968 | 2/1975 | Anderson . |
| 3,921,152 | 11/1975 | Hagar et al. . |
| 3,969,929 | 7/1976 | Shaw et al. ............. 73/151 |
| 3,995,479 | 12/1976 | Chapman . |
| 4,043,191 | 8/1977 | Mills . |
| 4,174,628 | 11/1979 | van den Bussche et al. . |
| 4,184,205 | 1/1980 | Morrow . |

*Primary Examiner*—Howard A. Birmiel
*Attorney, Agent, or Firm*—A. Joe Reinert

[57] ABSTRACT

Strain gauges are attached to a drill pipe which is inserted into a drill pipe string to be used in a well. The strain gauges are connected to an electrical circuit containing devices for digitizing the electrical signals generated by the strain gauges in response to the detection of strain and for recording and retaining the digitized signals until the drill pipe string is extracted from the well. The electrical circuit provides a communication path through which the stored digitized data is transferred to an external device when the drill pipe string is extracted from the well.

21 Claims, 6 Drawing Figures

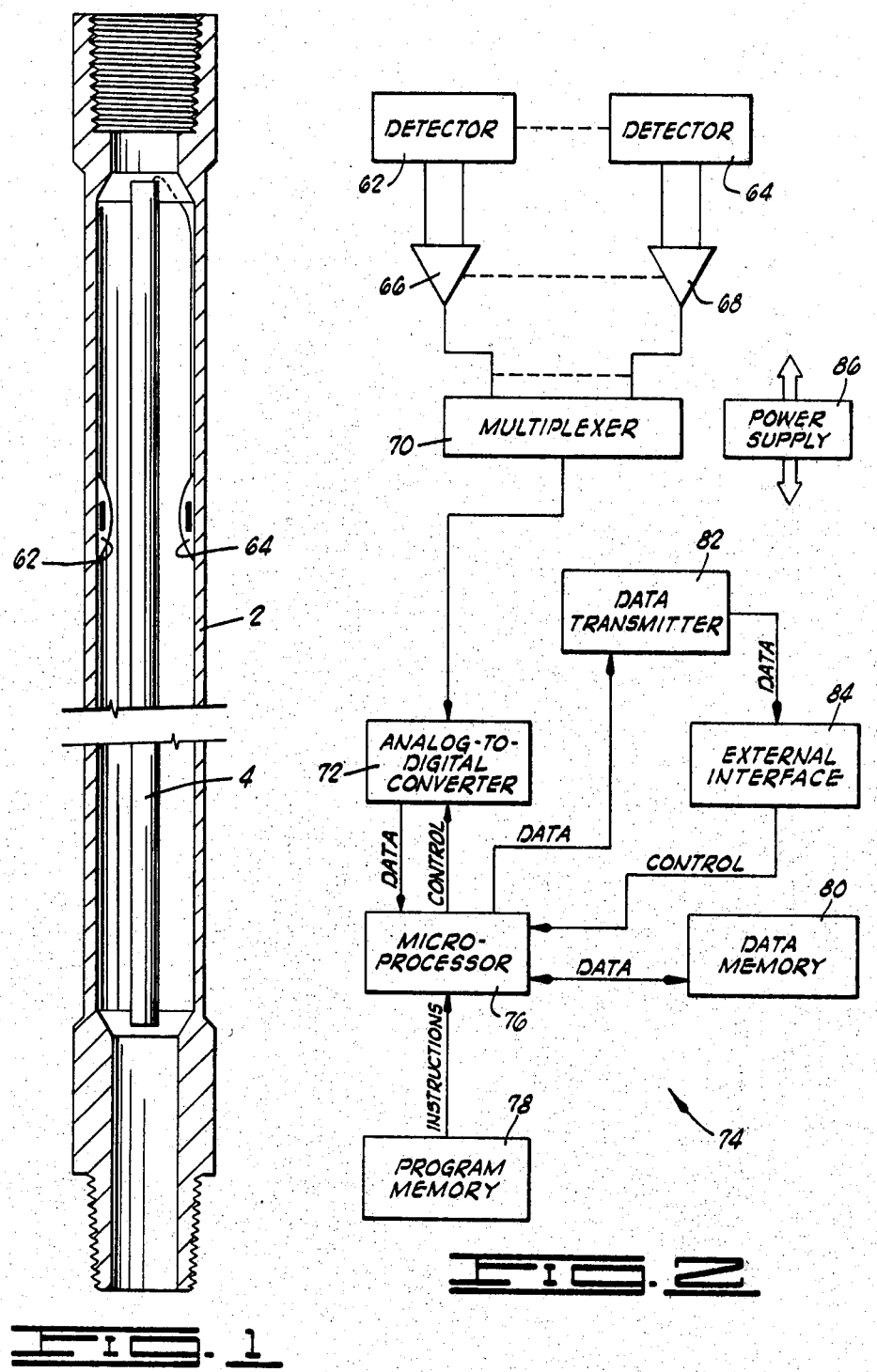

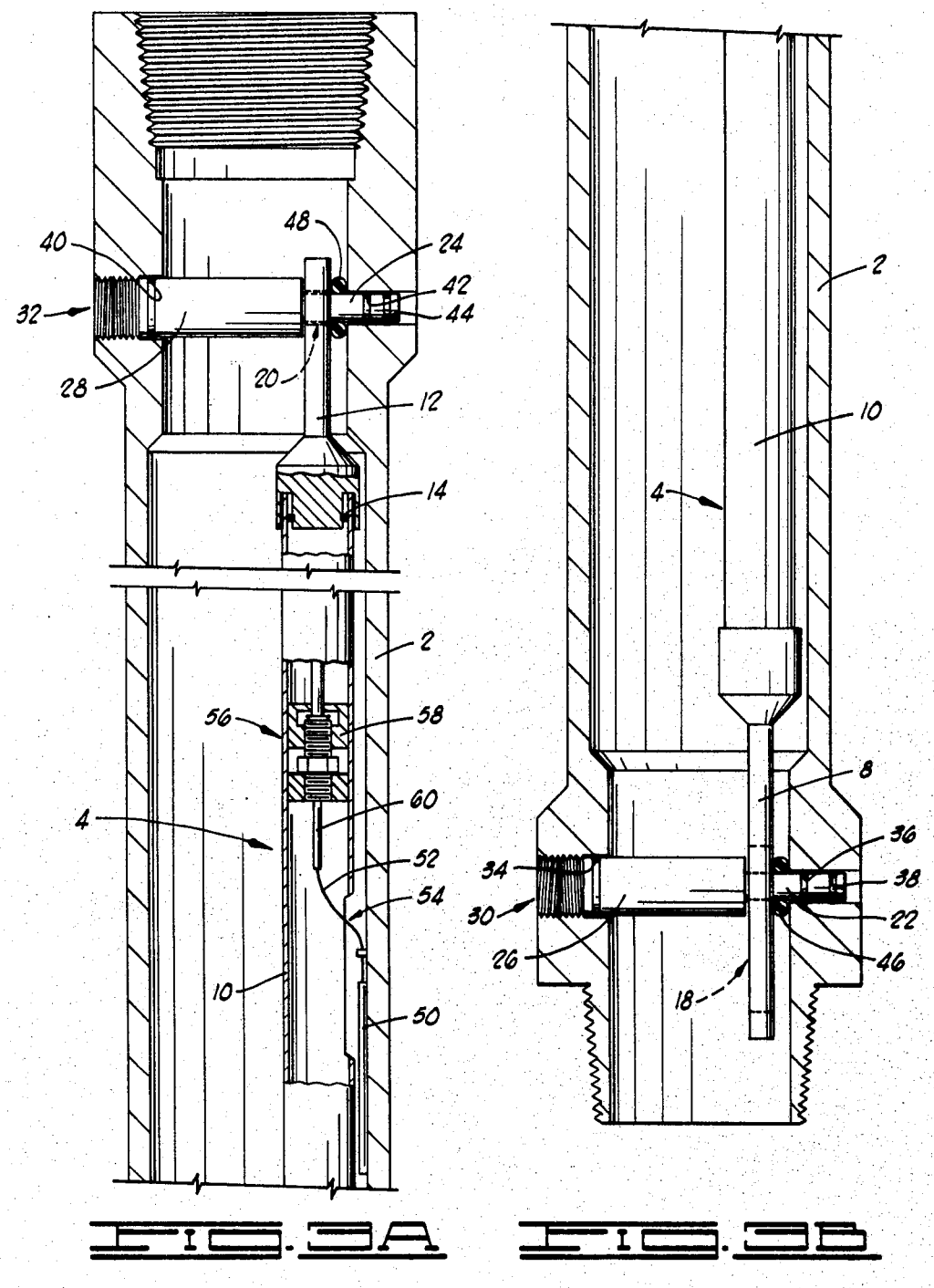

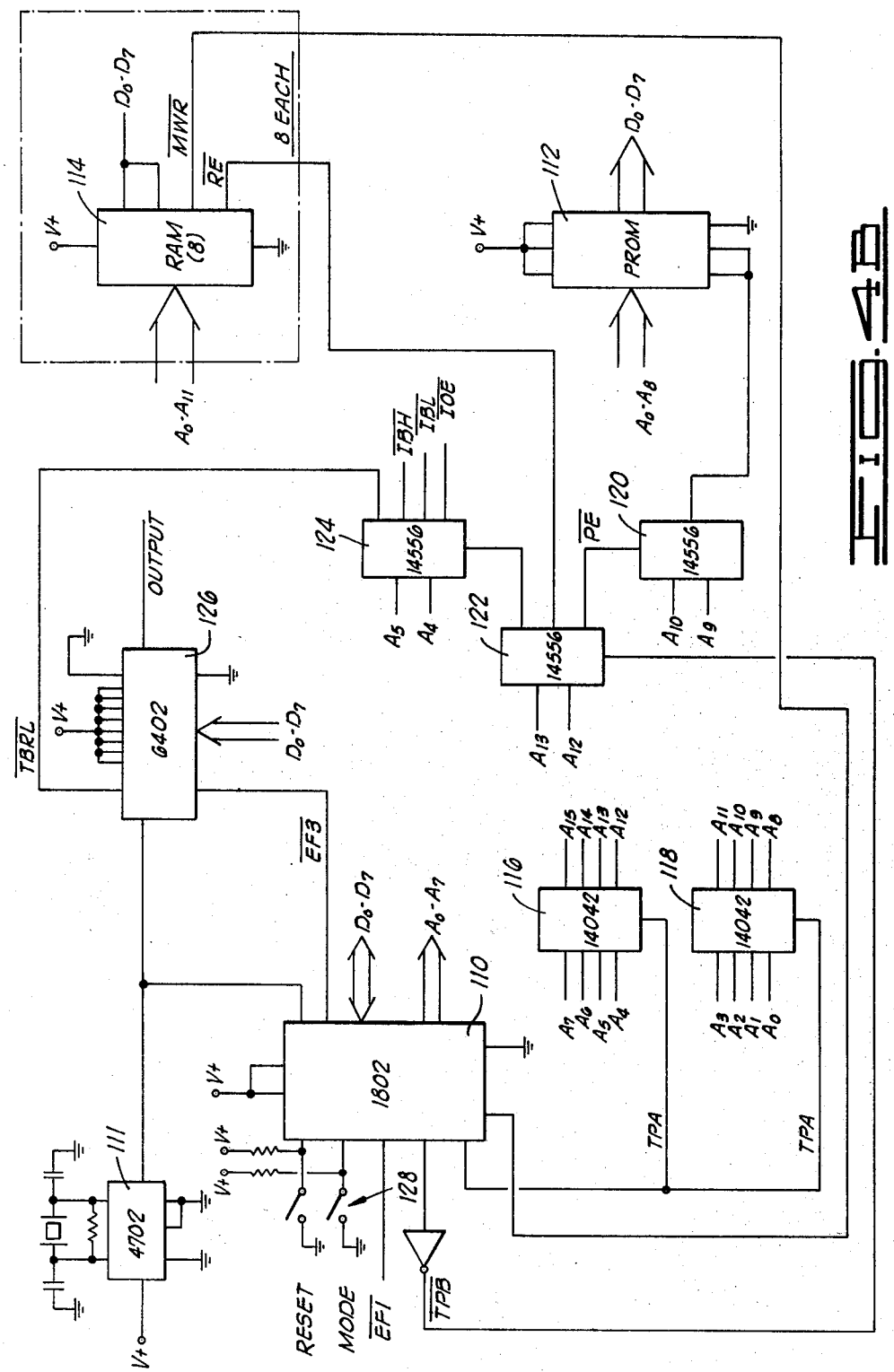

FATIGUE GAUGE FOR DRILL PIPE STRING

BACKGROUND OF THE INVENTION

1. Field of the Invention

This invention relates generally to apparatus for determining the actual stress history of a drill pipe string and more particularly, but not by way of limitation, to apparatus for electronically detecting and recording the strain on a drill pipe string in a well so that the recorded information can be retrieved and an analysis of fatigue damage to the drill pipe string can be made therefrom after the string has been extracted from the well.

2. Description of the Prior Art

In drilling operations, such as are conducted in the drilling of oil and gas wells, it is necessary to monitor the drill pipe string for fatigue so that failures thereof are reduced or prevented. Presently, such monitoring is performed by making fatigue life predictions based on theoretical calculations of stresses on the drill string and conducting inspections of the pipe in the drill string. These predictions are generally made for drilling operations in deep and highly deviated wells and are generally unreliable.

Because such predictions are unreliable, the visual inspections are performed at arbitrary, and thus sometimes unnecessary, times to avoid unexpected fatigue failures. Such inspections are expensive because of the high cost for making the inspection and also because of the delay in the drilling operation caused by the inspection. To reduce this cost by establishing a proper inspection frequency for the drill string and to better monitor the load, or stress, history of the drill string so that fatigue damage thereto can be better assessed, a more realistic means for measuring the stresses on the drill string is needed.

Several means for monitoring stress with strain gauges associated with a well and means for acquiring data have been proposed. For example, U.S. Pat. No. 3,921,152 in the name of Hagar et al. discloses an automatic data retrieval system which includes strain gauges mounted on pumping wells for providing inputs to field-located remote terminal units which store data and forward data to a central computer upon command from the central computer.

U.S. Pat. No. 3,686,942 in the name of Chatard et al. discloses an apparatus comprising strain gauges for sending electrical signals corresponding to detected strain to electronic circuits for data and information processing.

U.S. Pat. No. 3,376,921 in the name of Manry et al. discloses a plurality of strain gauges positioned on a pipe string with a means connected to a transducer for producing an output signal representative of the relative magnitude of force exerted on the pipe string.

Other proposed means for monitoring loads and stresses on various components in drilling and production operations are disclosed in U.S. Pat. No. 3,864,968, U.S. Pat. No. 4,043,191 in the name of Mills, and U.S. Pat. No. 4,174,628 in the name of van den Bussche et al.

U.S. Pat. No. 3,955,479 in the name of Chapman, III generally discloses electronic circuitry used for obtaining downhole measurements and mounted on an elongated support or chassis removably disposed within a tubular housing.

U.S. Pat. No. 4,184,205 in the name of Morrow discloses a data acquisition system including a multiplexer, an analog-to-digital converter, a microcomputer, read only memory and random access memory.

U.S. Pat. No. 3,495,079 in the name of Halawa et al. discloses apparatus for determining the stresses in a structure due to static and dynamic loading thereof.

Although a number of the foregoing patents disclose various means for monitoring downhole conditions, none of them discloses an apparatus for generating an exact load, or stress, history of the drill string which is retained in the downhole environment until the drill string is extracted from the well. Additionally, these patents fail to disclose that such an apparatus includes data transmitter means and interface means through which communicative access to the data stored within the apparatus is gained by an external device.

SUMMARY OF THE INVENTION

The present invention overcomes the above-noted and other shortcomings of the prior art by providing a novel and improved apparatus for recording stress in a drill pipe or drill pipe string. This apparatus is used as a fatigue gauge to generate a load history of the stresses acting on the drill string and to communicate the data comprising this history through an interface means to an external device once the drill string has been withdrawn from the well.

Broadly, the present invention provides an instrumented drill pipe having a strain gauge or gauges and a data acquisition system encapsulated on or in a drill pipe. The data acquisition system receives and retains data from the strain gauge or gauges so that after each trip of the drill pipe into the well the strain gauge data can be retrieved from the data determined. Based on such data, a more realistic percentage of fatigue damage to the drill pipe and to the overall drill string can be calculated and better inspection criteria can be established based on the measured data and on the fatigue damage tolerance of the drill pipe.

Therefore, from the foregoing it is a general object of the present invention to provide a novel and improved apparatus for determining the stress history of a drill pipe string. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a schematic representation of the present invention retained within a drill pipe shown in section.

FIG. 2 is a block diagram of the electronics portion of the present invention.

FIGS. 3A and 3B are a partial sectional view of a drill pipe having a preferred embodiment of the present invention retained therein.

FIGS. 4A and 4B form a schematic circuit diagram of a preferred embodiment of the electronics portion of the present invention.

DETAILED DESCRIPTION OF THE PREFERRED EMBODIMENTS OF THE INVENTION

Figure 4A:
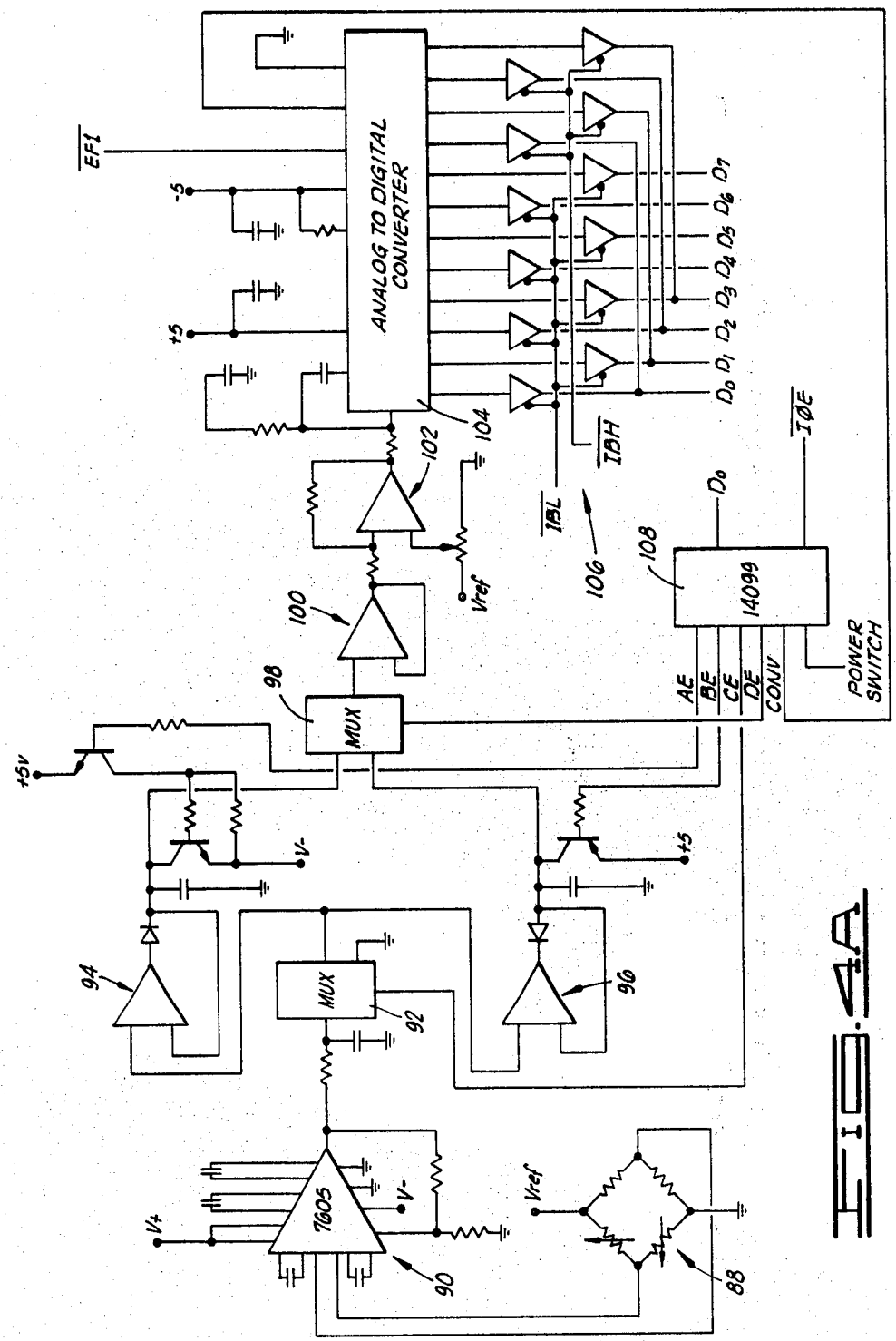

With reference to the drawings a description of the preferred embodiments of the present invention will be given. FIG. 1 discloses a drill pipe 2 instrumented with the present invention. The drill pipe 2 is located within a drill pipe string at a position where it will be subjected to high stress when the drill string is in a well. High stress can occur at such places as doglegs, the drill stem area, and the upper hole region. The drill pipe 2 is preferably of the same grade, service history and length as the other elements of the drill string or of a higher class than the other elements. The drill pipe 2 is preferably to be used for inspection purposes as well as for carrying the present invention.

The present invention which is associated with the drill pipe 2 includes a housing 4 which can be retained substantially coaxially within the drill pipe 2 by appropriate retaining means, such as a centralizer or clamp means (not shown), as illustrated in FIG. 1. The housing 4 can also be retained in an offset manner as shown in FIGS. 3A–3B. In general, it is preferred that the housing 4 be maintained in spaced relation with the interior of the drill pipe 2 by suitable spacer means.

The preferred embodiment depicted in FIGS. 3A–3B shows the housing 4 disposed longitudinally within the pipe 2 and substantially adjacent, but spaced from, the interior surface of the side wall of the pipe 2. The housing 4 of the FIGS. 3A–3B embodiment includes a first elongated end member 8 threadedly connected to a first end of a central member 10 which is preferably a cylindrical, elongated tube. The housing 4 also includes a second elongated end member 12 threadedly connected to the other end of the central member 10. Each of these threaded connections are fluid-tightly sealed by means of respective suitable O-rings, such as O-ring 14 shown in FIG. 3A.

The end pieces 8 and 12 have respective slotted apertures 18 and 20, respectively, defined therein for receiving retaining portions 22 and 24, respectively, of stepped pins 26 and 28, respectively. As shown in FIGS. 3A and 3B, the pins 26 and 28 are threadedly connected at one end thereof in respective holes 30 and 32 formed in respective ones of the end collars of the pipe 2. The pin 26 is fluid-tightly sealed by means of suitable O-rings 34, 36 and 38, and the pin 28 is fluid-tightly sealed by means of suitable O-rings 40, 42 and 44. Lock washers 46 and 48 are placed around the retaining neck portions 22 and 24, respectively, between the respective end member and the side wall of the pipe 2. In an alternative embodiment the pins 26 and 28 are bolt-like elements extending through only one side of the respective collars and being retained therein and through the ends of the housing by means of suitable retaining elements, such as nuts.

The FIGS. 3A–3B embodiment discloses a single strain gauge 50 attached by suitable means to the side wall of the pipe 2. The strain gauge 50 is electrically connected by means of suitable conductor means 52 to an electronics package suitably packaged and retained within the housing 4. To properly seal the electronics package from the fluid which is contained within the well bore and which enters a portion of the housing 4 through an opening 54 formed therein to permit the conductor 52 to pass into the housing 4, the housing 4 contains a conductor port structure 56 through which the electrical conductor 52 passes.

The port structure 56 comprises a stainless steel lock fitting structure 58 as shown in FIG. 3A. The lock fitting 58 retains a reinforced high-temperature Teflon housing 60 within the housing 4. The electrical conductor 52 passes through the housing 60 into a fluid-tightly sealed area on the side of the lock fitting 58 away from which the electrical conductor 52 enters the Teflon housing 60 as shown in FIG. 3A. In the preferred embodiment the lock fitting structure 58 is positioned approximately six feet from the box end of the drill pipe 2 and approximately twenty-four feet from the pin end of the drill pipe 2.

The electronics portion of the present invention includes detector means for detecting stress in the drill pipe 2, specifically, and in the drill pipe string, generally, of which the drill pipe 2 is a part. The detector means is shown in FIG. 1 to comprise a plurality of devices including a first strain gauge means 62 and a second strain gauge means 64. In the FIGS. 3A–3B embodiment the detector means includes the single strain gauge 50. Each of the devices is associated with a respective portion of the drill pipe 2 of the drill pipe string; and each includes, in the preferred embodiment, an encapsulated strain gauge of any suitable type known in the art attached to a respective portion of the drill pipe string. Each strain gauge means detects strain and generates a respective analog signal in response to and proportional to the detected strain.

The electronics portion of the present invention further includes the electronics package having electrical circuit means disposed within the housing 4. The electrical circuit means is connected by suitable electrical conductors, such as the conductor 52 shown in FIG. 3A, to the detector means and provides a data acquisition system for the data obtained from the detector means. The detector means and the electrical circuit means form the electronics portion of the present invention. While drilling is in progress, this electronics portion gathers strain data and processes and stores the data as electrically coded information corresponding to the detected stress. These data are subsequently transferred to an external permanent memory or other external device (not shown) upon retrieval, or extraction, of the drill string and the drill pipe 2 from the well.

The electrical circuit means contained within the housing 4 is generally depicted in FIG. 2. The electrical circuit means records the electrical signals from each of the detector means shown in the FIG. 2 embodiment and returns the recorded electrical signals until the drill pipe string, including the drill pipe 2, is extracted from the well.

In the FIG. 2 embodiment the electrical circuit means includes a plurality of differential amplifier means, two of which are identified by the reference numerals 66 and 68. Each differential amplifier means receives a respective one of the analog electrical signals generated by a respective one of the strain gauge means in response to stress detected in the drill pipe 2. The outputs from each of the differential amplifier means are provided to respective inputs of a multiplexer means 70.

The multiplexer means 70 sequentially electrically connects a respective one of its inputs to its output for channeling therethrough the analog electrical signal applied to the respective input. The channeling performed by the multiplexer means 70 transfers each respective analog signal to an analog-to-digital converter means 72, connected to the output of the multiplexer means 70, for converting each respective analog electrical signal to a corresponding digital electrical signal. The conversion means 72 is responsive to control signals from a control means 74.

The control means 74 includes a microcomputer having microprocessor means 76 and program memory means 78. The program memory means 78 is preferably a read only memory (ROM) having the instructions for controlling the microprocessor means 76 stored therein. Under control of the instructions from the program memory 78, the microprocessor means 76 sends control signals to the analog-to-digital converter means 72 and the multiplexer means 70 so that it receives the digital data therefrom and stores the digital data in a suitable data memory means 80.

The data memory means is preferably a read/write type of electronic memory, such as a random access memory (RAM). The data memory means 80 stores the electrical signals to be recorded for later transmission once the drill string is extracted from the well.

The control means 74 also controls a data transmitter means 82 to transmit the recorded electrical signals stored in the data memory means 80 to an external device. Transmission by the data transmitter means 82 to the external device is through a communication path provided by an interface means 84. The interface means 84 provides an external port through which communicative access to the electrical circuit means is gained by a suitable device.

The aforementioned elements of the electrical circuit means are of suitable types known in the art. These elements are powered by a suitable power supply 86, such as a battery, which is capable of operating for an extended period of time in a severe working environment having high temperatures and pressures. In the preferred embodiment it is contemplated that a suitable battery is a lithium/thionyl chloride battery capable of operating to 150° C.

With reference to FIGS. 4A and 4B a preferred embodiment of the electronics portion generally depicted in FIG. 2 and described hereinabove will be described. A single strain gauge 88 is depicted in FIG. 4A in the form of a resistive bridge as is known in the art. This bridge responds to stresses detected in the pipe 2 to which it is connected and provides an analog electrical input to a differential amplifier 90 having an output which is connected to an input of a first analog multiplexer 92. The analog multiplexer 92 is controllable so that its output is switchable between the signal developed by the strain gauge 88 and one of two possible references. The two possible references are preferably either ground potential or the voltage reference potential applied to the strain gauge 88. For the FIGS. 4A-4B embodiment the reference is shown to be ground potential. The reference is used to check for voltage drift in the system.

The selected signal channeled through the multiplexer 92 to its output is electrically connected to respective inputs of respective operational amplifiers 94 and 96 functioning as analog peak signal readers. The first operational amplifier 94 reads peak positive values and the second operational amplifier 96 reads the minimum value signals. The outputs from the peak signal readers 94 and 96 are applied to respective inputs of a second analog multiplexer 98.

The second analog multiplexer 98 selectively channels one of the inputs to its output for providing an output to an isolation amplifier 100 and a scaling amplifier 102 for conditioning the signal prior to conducting it to an analog-to-digital converter 104.

The analog-to-digital converter 104 has twelve tri-state outputs 106. The tri-state means of the outputs is required to transfer the twelve-bits of digitally coded information on an eight-bit data bus which is used in the prefered embodiment.

Also disclosed in FIG. 4A is an eight-bit addressable latch 108 which has a serial input and a parallel output through which control signals are transferred to respective elements of the present invention as illustrated in FIG. 4A. The latch 108 is operated under control of a microprocessor 110 which is schematically illustrated in FIG. 4B.

The microprocessor 110 is operated under control of a suitable clock means 111 and instructions from a suitable ROM 112 such as a 512×8 CMOS PROM model 6654.

As the microprocessor 110 functions under control of the instruction from the ROM 112, it manipulates and stores the strain gauge data in suitable locations within a suitable random access memory 114. In the preferred embodiment the memory 114 is dynamic and includes eight 4096×1 model 6564 RAM chips.

To provide adequate addressing for the total number of addressable locations in memory, the portion of the electronics package depicted in FIG. 4B also includes two latches 116 and 118 for retaining digital electrical signals from the microprocessor 110 used as addresses $A_8-A_{15}$.

Additional control signals neededd to control various elements shown in FIGS. 4A and 4B are provided through three binary-to-one of four decoders 120, 122 and 124. One of these control signals controls a universal asynchronous receiver/transmitter (UART) means 126 used to read data from the memory 114 to the external device such as a digital cassette recorder (not shown). The external device is connected through the interface means 30, such as a coupling jack (not shown), to the output of the receiver/transmitter means 126. A switch can be provided to manually actuate the transfer of the data to the external device once the drill pipe 2 is withdrawn from the hole and connected to the external device. In the preferred embodiment shown in FIGS. 4A and 4B, data is transferred when a mode switch 128, shown in FIG. 4B, is closed. If needed, the present invention can be constructed so that the external device can send control signals to the microprocessor 110 over a direct communication line or through the receiver/transmitter means 126.

The present invention is used by retaining in the drill pipe 2 the electronic means for detecting stress in the drill pipe. The instrumented drill pipe 2 is then lowered into a well where the electronic means detects stress in the drill pipe 2 and records the detected stress in the form of digitized electrical signals retained in the random access memory, such as the RAM 114 of the FIGS. 4A-4B embodiment. In the preferred embodiment stress data are collected at approximately fifteen-minute intervals over a period of five days.

Upon extraction of the drill pipe string from the well, the recorded electrical signals are electrically accessed, or read, from the electronic means through the universal asynchronous receiver/transmitter means 126 for the embodiment shown in FIGS. 4A-4B and the external interface means 30 and onto the external device for off-line analysis.

For the FIGS. 4A-4B embodiment signals from the strain gauge 88 are routed through the associated differential amplifier 90 to the first multiplexer 92. The output from the multiplexer 92 causes values to be stored on the peak reading means 94 and 96 at the input of the second multiplexer 98. At specified intervals as determined by the software instructions contained in the ROM 112, an interrupt signal is sent to the microprocessor 110 to cause the microprocessor 110 to enable the analog-to-digital converter 104 to read the two values stored at the inputs of the second multiplexer 98. Prior to being converted, these two values are scaled by the scaling amplifier 102.

The twelve-bit output of the analog-to-digital converter 104 is read into the microprocessor 110 and stored in the random access memory 114 through a polling process whereby the lower eight bits are transferred under control of a signal labelled $\overline{IBL}$ in FIGS. 4A and 4B and the upper four bits are transferred under control of a signal labelled $\overline{IBH}$. The output signals from the analog-to-digital converter 104 stored in the random access memory 114 are retained therein for the duration of the drilling operation.

When the drill pipe 2 is retrieved or extracted from the well, an electrical connector from an external device is coupled with the interface means 30. For the FIGS. 4A-4B embodiment the interface means 30 (not shown) connects the external device to the output of the universal asynchronous receiver/transmitter means 126. Once the external device is connected, the mode switch 128 shown in FIG. 4B is closed thereby causing the data stored in the random access memory 114 to be transferred to the interface means 30 and the external device through the data transmitter means 126. The transferred data can then be used to determine the load history on the drill pipe string.

Incorporation of such an inventive self-contained apparatus as described hereinabove in a drill pipe string is a relatively economical means for drilling companies and oil producers and the like to determine fatigue damage, drill pipe life and downgrading requirements. The data obtained from the present invention can be used to calculate fatigue damage and to establish criteria for inspection and replacement of the drill pipe string.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

We claim:

1. An apparatus for recording stress in a drill pipe positioned in a well, comprising:
    detector means for detecting stress in said drill pipe and converting the detected stress into a corresponding electrical signal; and
    electrical circuit means, disposed in said drill pipe, for recording said electrical signal and for retaining said recorded electrical signal until said drill pipe is extracted from said well.

2. An apparatus as defined in claim 1, wherein said electrical circuit means includes:
    data memory means for storing the recorded electrical signal;
    interface means for providing an external port through which communicative access to said electrical circuit means is gained;
    data transmitter means for transmitting the recorded electrical signal from said memory means to said interface means; and
    control means for controlling said data transmitter means to transmit the recorded electrical signal from said memory means to said interface means.

3. An apparatus as defined in claim 2, wherein:
    said detector means includes a plurality of strain gauge means for detecting strain and for generating respective analog electrical signals in response to detected strain; and
    said electrical circuit means further includes: conversion means, responsive to said control means, for converting the respective analog electrical signals to corresponding digital electrical signals for storage in said data memory means; and
    multiplexer means for sequentially channeling each of the respective analog electrical signals to said conversion means.

4. An apparatus as defined in claim 3, wherein said control means includes a microcomputer associated with said data memory means and said data transmitter means.

5. An apparatus as defined in claim 3, wherein each of said strain gauge means includes an encapsulated strain gauge attached to a respective portion of the drill pipe.

6. An apparatus as defined in claim 1, further comprising:
    a housing having said electrical circuit means disposed therein; and
    retaining means for retaining said housing within the drill pipe.

7. An apparatus as defined in claim 6, wherein:
    said housing includes a cylindrical, elongated tube; and
    said retaining means includes centralizer means for positioning said cylindrical, elongated tube substantially co-axially within the drill pipe.

8. An apparatus as defined in claim 7, wherein said electrical circuit means includes:
    data memory means for storing the recorded electrical signal;
    interface means for providing an external port through which communicative access to said electrical circuit means is gained;
    data transmitter means for transmitting the recorded electrical signal from said memory means to said interface means; and control means for controlling said data transmitter means to transmit the recorded electrical signal from said memory means to said interface means.

9. An apparatus as defined in claim 8, wherein:
    said detector means includes a plurality of strain gauge means for detecting strain and for generating respective analog electrical signals in response to detected strain; and
    said electrical circuit means further includes:
    conversion means, responsive to said control means, for converting the respective analog electrical signals to corresponding digital electrical signals for storage in said data memory means; and
    multiplexer means for sequentially channeling each of the respective analog electrical signals to said conversion means.

10. An apparatus as defined in claim 9, wherein said control means includes a microcomputer associated with said data memory means and said data transmitter means.

11. An apparatus as defined in claim 9, wherein each of said strain gauge means includes an encapsulated strain gauge attached to a respective portion of the drill pipe.

12. A fatigue gauge for a drilling pipe string which can be lowered into and extracted from a well, comprising:

a plurality of strain gauge means, attachable to a drill pipe of said drill pipe string prior to said drill pipe string being lowered into said well, for converting the detected stress into respective proportional analog electrical signals;

a plurality of differential amplifier means, each of which for receiving a respective one of the analog electrical signals and each of which being disposable in said drill pipe string prior to said drill pipe string being lowered into said well;

multiplexer means, having a plurality of inputs each being connected to the output of a respective one of said differential amplifier means and further having an output, for sequentially electrically connecting a respective one of said inputs to said output for channeling the respective analog electrical signal therethrough;

analog-to-digital converter means, connected to the output of said multiplexer means, for converting each respective analog electrical signal to a corresponding digital electrical signal;

data memory means for electrically storing each of the digital electrical signals therein;

control means for controlling the transferal of each of the digital electrical signals from said analog-to-digital converter means to said data memory means;

interface means for providing a communication path external to the drill pipe string, along which communication path said digital electrical signals can pass to an external device connected thereto only after said drill pipe string has been extracted from said well; and data transmitter means, responsive to said control means, for transmitting to said interface means the digital electrical signals stored in said data storage means.

13. An apparatus as defined in claim 12, wherein said control means includes a microcomputer connected with said analog-to-digital converter means and said data memory means.

14. An apparatus as defined in claim 13, further comprising:

a cylindrical, elongated tube having said plurality of differential amplifier means, said multiplexer means, said analog-to-digital converter means, said data memory means, said control means, said interface means, and said data transmitter means disposed therein; and centralizer means for positioning and retaining said cylindrical, elongated tube substantially co-axially with the drill pipe string.

15. A fatigue gauge for a drill pipe used in a well, comprising:

electronic means for detecting stress in the pipe and for retaining electrically coded information corresponding to the detected stress until the drill pipe has been extracted from the well, said electronic means including:

strain gauge means, connectible to the drill pipe, for generating respective analog electrical signals in response to detected stress;

first analog multiplexer means for selectively channeling either said respective analog electrical signals or a predetermined reference signal to an output of said first analog multiplexer means;

first analog peak reading means for detecting the peak positive signals channeled to the output external to said housing.

16. A fatigue gauge as defined in claim 15, wherein said means for transferring includes universal asynchronous receiver/transmitter means for communicating with a device of said first analog multiplexer means and for providing a first output corresponding thereto;

second analog peak reading means for detecting the peak minimum signals channeled to the output of said first analog multiplexer means and for providing a second output corresponding thereto;

second analog multiplexer means for selectively channeling either said first output of said first analog peak reading means or said second output of said second analog peak reading means to an output of said second analog multiplexer means;

analog-to-digital converter means for converting the electrical signal selectively channeled through said second analog multiplexer means into a corresponding digital signal;

electronic memory means, disposable in the drill pipe, for retaining data;

means for storing said digital signal in said electronic memory means; and means for transferring said digital signal from said electronic memory means after the drill pipe has been extracted from the well; and a housing for retaining said electronic means in the drill pipe.

17. A fatigue gauge as defined in claim 15, wherein said housing includes:

a central member;

a first end member, connected to a first end of said central member, having a first elongated portion in which a first aperture is defined;

a second end member, connected to a second end of said central member, having a second elongated portion in which a second aperture is defined;

first retaining means, passing through said first aperture and retained in the drill pipe, for retaining said housing in the drill pipe;

second retaining means, passing through said second aperture and retained in the drill pipe, for retaining said housing in the drill pipe; and means for fluid-tightly sealing said electronic means in said housing.

18. A method for determining the stress history in a drill pipe string, comprising the steps of:

retaining in the drill pipe string electronic means for detecting stress, said electronic means including means for providing an external electrical port through which communicative access to said electronic means is gained;

lowering the drill pipe string having said electronic means retained therein into a well;

actuating said electronic means to detect stress in the drill pipe string and to record the detected stress in the form of electrical signals;

extracting the drill pipe string from the well; and electrically accessing the electrical signals from said electronic means through said means for providing an external electrical port.

19. A method as defined in claim 18, wherein the step of actuating said electronic means includes the steps of:

monitoring for stress in the drill pipe string with a plurality of strain gauge means for detecting stress in the drill pipe;

converting stress which is detected by any of said plurality of strain gauge means into respective analog electrical signals;
channeling each respective analog electrical signal to an analog-to-digital converter forming a part of said electronic means;
converting each respective analog electrical signal into a corresponding digital electrical signal; and
storing each digital electrical signal in data memory forming a part of said electronic means.

20. An apparatus for recording stress in a drill pipe which is to be lowered into and extracted from a well, comprising:
detector means for detecting stress in said drill pipe at a plurality of times and for generating electrical signals corresponding to the detected stress, each of said electrical signals representing an individual stress measurement;
recording means, disposable in said drill pipe prior to said drill pipe being lowered into said well, for electronically retaining digital signals representative of said corresponding electrical signals until said drill pipe is extracted from said well; and
transmitting means, disposable in said drill pipe prior to said drill pipe being lowered into said well, for transmitting said digital signals to an external device connectible to said apparatus only after said drill pipe has been extracted from said well.

21. An apparatus as defined in claim 20, wherein said recording means includes:
analog-to-digital conversion means for converting said corresponding electrical signals into said digital signal;
random access memory means for providing electronic storage into which said digital signals can be placed; and
microcomputer means for controlling the storage of said digital signals in said random access memory means and for controlling said transmitting means after said drill pipe has been extracted from said well.

* * * * *